(12) United States Patent
Lu et al.

(10) Patent No.: US 10,792,766 B2
(45) Date of Patent: Oct. 6, 2020

(54) COMBINED APPARATUS FOR LAYER-BY-LAYER INTERACTIVE ADDITIVE MANUFACTURING WITH LASER THERMAL/MECHANICAL EFFECTS

(71) Applicant: JIANGSU UNIVERSITY, Jiangsu (CN)

(72) Inventors: Jinzhong Lu, Jiangsu (CN); Haifei Lu, Jiangsu (CN); Jianhua Yao, Jiangsu (CN); Kaiyu Luo, Jiangsu (CN); Fangnian Lang, Jiangsu (CN); Liujun Wu, Jiangsu (CN); Yikai Shao, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 0 days.

(21) Appl. No.: 16/068,806

(22) PCT Filed: Jun. 8, 2017

(86) PCT No.: PCT/CN2017/087533
§ 371 (c)(1),
(2) Date: Jul. 9, 2018

(87) PCT Pub. No.: WO2018/196106
PCT Pub. Date: Nov. 1, 2018

(65) Prior Publication Data
US 2020/0189037 A1    Jun. 18, 2020

(30) Foreign Application Priority Data

Apr. 25, 2017    (CN) .......................... 2017 1 0273048

(51) Int. Cl.
*B23K 26/342*    (2014.01)
*B33Y 10/00*    (2015.01)
(Continued)

(52) U.S. Cl.
CPC .......... *B23K 26/342* (2015.10); *B23K 26/009* (2013.01); *B23K 26/0093* (2013.01);
(Continued)

(58) Field of Classification Search
CPC .............. B23K 26/342; B23K 26/0622; B23K 26/146; B23K 26/356; B23K 26/009;
(Continued)

(56) References Cited

U.S. PATENT DOCUMENTS

2017/0173690 A1*    6/2017    Kaneko ................. B22F 3/1055

FOREIGN PATENT DOCUMENTS

CN    102328081 A    1/2012
CN    104923789 A    9/2015
(Continued)

*Primary Examiner* — Phuong T Nguyen
(74) *Attorney, Agent, or Firm* — Saliwanchik, Lloyd & Eisenschenk

(57) ABSTRACT

The invention relates to additive manufacturing field and laser shock peening (LSP) field, in particular to a combined apparatus for layer-by-layer interactive additive manufacturing with laser thermal/mechanical effects. In the apparatus, a LSP module and a SLM module operate in alternate so as to perform LSP for the formed part in the forming process of the formed part, and thereby a better strengthening effect of the formed part is achieved. The invention effectively overcomes the challenges of "shape control" against deformation and cracking of the formed parts incurred by internal stress and "property control" against poor fatigue property of the formed parts incurred by metallurgical defects during additive manufacturing, improves fatigue strength and mechanical properties of the faulted parts, and realizes high-efficiency and high-quality holistic processing of the formed parts.

10 Claims, 3 Drawing Sheets

(51) Int. Cl.
    *B33Y 30/00*     (2015.01)
    *B23K 26/0622*     (2014.01)
    *B23K 26/146*     (2014.01)
    *B23K 26/356*     (2014.01)
    *B33Y 40/20*     (2020.01)
    *B23K 26/00*     (2014.01)
    *B23K 26/06*     (2014.01)
    *B23K 26/08*     (2014.01)
    *B23K 26/14*     (2014.01)
    *C21D 10/00*     (2006.01)

(52) U.S. Cl.
    CPC ...... *B23K 26/0622* (2015.10); *B23K 26/0626* (2013.01); *B23K 26/083* (2013.01); *B23K 26/146* (2015.10); *B23K 26/1464* (2013.01); *B23K 26/356* (2015.10); *B33Y 10/00* (2014.12); *B33Y 30/00* (2014.12); *B33Y 40/20* (2020.01); *C21D 10/005* (2013.01)

(58) Field of Classification Search
    CPC ............ B23K 26/0093; B23K 26/0626; B23K 26/083; B23K 26/1464; B33Y 10/00; B33Y 30/00; B33Y 40/20
    USPC ... 219/76.1, 121.36, 121.61, 121.67, 121.72, 219/121.85
    See application file for complete search history.

(56) References Cited

FOREIGN PATENT DOCUMENTS

| | | |
|---|---|---|
| CN | 105154870 A | 12/2015 |
| CN | 106244791 A | 12/2016 |
| DE | 10360094 A1 | 9/2005 |
| JP | 2016211050 A | 12/2016 |
| JP | 6074490 B1 | 2/2017 |

\* cited by examiner

COMBINED APPARATUS FOR LAYER-BY-LAYER INTERACTIVE ADDITIVE MANUFACTURING WITH LASER THERMAL/MECHANICAL EFFECTS

CROSS REFERENCE TO RELATED APPLICATIONS

This application is a National Stage Application of International Application Number PCT/CN2017/087533, filed Jun. 8, 2017; which claims priority to Chinese Application No. 201710273048.3, filed Apr. 25, 2017.

TECHNICAL FIELD

The present invention relates to additive manufacturing field and laser shock peening (LSP) field, in particular to a combined apparatus for layer-by-layer interactive additive manufacturing with laser thermal/mechanical effects, which effectively overcomes the challenges of "shape control" against deformation and cracking of the formed parts incurred by internal stress and "property control" against poor fatigue property of the formed parts incurred by metallurgical defects during additive manufacturing, improves fatigue strength and mechanical properties of the formed parts, and realizes high-efficiency and high-quality holistic processing of the formed parts.

BACKGROUND ART

Selective laser melting (SLM) technology is a leading-edge rapid prototyping technology emerged in recent years, which can be used for additive manufacturing through layer-by-layer manufacturing and convert a CAD model into physical parts with powders. SLM employs laser to melt the metal powder in a selected area quickly and employs a quick cooling and solidification technology, so as to obtain supersaturated solid solution in a non-equilibrium state as well as uniform and fine metallographic structures. In addition, a wide range of materials can be used for forming, the manufacturing process is not limited by complex structures of the metal parts, no tooling or mold is required, and the process is simple. SLM can realize quick manufacturing of metal parts at reduced costs, and can realize manufacturing of gradient functional materials in which the material component varies continuously.

Laser shock peening (LSP) is a new surface peening technology, which mainly employs short pulse (tens of nanoseconds) laser with high-peak power density ($10^9$ $W/cm^2$) to irradiate metal surface, the laser beam is absorbed by an absorption layer after it passes through a confinement layer, and thereby the absorption layer obtains energy and undergoes explosive gasification and evaporation, and produces high-temperature and high-pressure plasma; due to confinement of the outer confinement layer, the plasma forms a high-pressure shock wave, which is propagated into the material, the surface layer of the material has plastic deformation under a force effect of the shock wave, so that the microstructure of the material in the surface layer is changed, the grain size in the material is refined, the material structure become denser and the porosity is decreased, and compressive residual stress is formed in greater thickness; the compressive residual stress layer can effectively eliminate stress concentration inside the material and inhibit crack initiation and growth, and remarkably improve fatigue life, corrosion resistance and wear resistance capabilities of key parts and components. The numerous researches have proved that the LSP technology is an effective measure for prolonging crack initiation time, decreasing crack growth rate, and improving material life.

Through a great progress has been achieved in laser additive manufacturing aspect in recent years, the SLM may produce a balling effect, which may result in increased cavities in the workpiece and decreased density and strength of the workpiece, owing to the fact that SLM is a rapid prototyping process and the tension force on the surface of molten metal is very high; since the metal powder is melted quickly and the molten pool exists for a short time, a high temperature gradient exists during quick solidification forming; consequently, high thermal stress may be produced easily, different structures have different thermal expansion coefficients and structural stress may be produced, and tensile residual stress exists in the solidified structures. As a result, cracks may occur in the workpiece under a combined action of the three types of stresses. The LSP technology can significantly refine the coarse grains in the cladding layer, induce compressive residual stress in great depth, and close tiny cracks and tiny metallurgical defects in the plastic deformation layer. Therefore, the LSP technology is a highly effective method for eliminating tensile residual stress in the cladding layer and refining grains.

In view of the above-mentioned problems, the present invention provides a combined apparatus for layer-by-layer interactive additive manufacturing with laser thermal/mechanical effects, which performs LSP in the forming process of the forming parts, effectively overcomes the challenges of "shape control" against deformation and cracking of the formed parts incurred by internal stress and "property control" against poor fatigue property of the formed parts incurred by metallurgical defects during additive manufacturing, improves fatigue strength and mechanical properties of the formed parts, and realizes high-efficiency and high-quality holistic processing of the formed parts.

CONTENTS OF THE INVENTION

The object of the present invention is to provide a combined apparatus for layer-by-layer interactive additive manufacturing with laser thermal/mechanical effects, which performs laser shock peening (LSP) in the forming process of the formed parts by utilizing LSP and selective laser melting (SLM) in alternate, i.e., performs LSP for each layer of powder material after the layer of powder is melted, and thereby effectively overcomes the challenges of "shape control" against deformation and cracking of formed parts incurred by internal stress and "property control" against poor fatigue property of the formed parts incurred by metallurgical defects during SLM, improves fatigue strength and mechanical properties of the formed parts, and realizes high-efficiency and high-quality holistic processing of the formed parts.

The present invention provides a combined apparatus for layer-by-layer interactive additive manufacturing with laser thermal/mechanical effects, which comprises a LSP module; a water jetting module; a SLM module; a waterproof layer application module composed of a waterproof layer, a drum, a drum support, a threaded lead screw and a motor; a water channel in shape of a hollow square which is enriched with another hollow square; a pneumatic module composed of an air compressor, an air cylinder and a control valve; a base; a hydraulic lifting module composed of a hydraulic cylinder, an electrical system and an liftable workbench; a guide rail; and a powder spreading module composed of a powder supply box, a scraper plate and a motor.

Wherein, the LSP module and the SLM module are disposed right above the formed part, and can be moved by a mechanical arm; the waterproof layer is disposed at the front side of the formed part, and can be moved front and back by driving the threaded lead screw with the motor, and can be moved up and down by the pneumatic module; a set of drum, drum support, threaded lead screw and motor is disposed at the left side and right side of the formed part respectively, wherein, the drum is disposed on the drum support, and the drum support is disposed on the threaded lead screw; the formed part may be placed on the liftable workbench; the powder spreading module is disposed at the back side of the formed part, and can be moved front and back in a reciprocating manner along the guide rail; the water channel in shape of a hollow square which is enriched with another hollow square is disposed around the liftable workbench, and the pneumatic module is disposed below the water channel; the base is disposed at the lowest part of the entire apparatus.

Preferably, in the combined apparatus for layer-by-layer interactive additive manufacturing with laser thermal/mechanical effects, the LSP module and the SLM module may operate in alternate to attain an effect of strengthening the formed part during forming of the part.

Preferably, the parameters of SLM forming are: spot diameter: 80 μm; laser wavelength: 1.06-1.10 μm; laser power: 200-1,000 W; scanning speed: 500-1,000 mm/s; thickness of spread powder layer: 0.01-0.1 mm.

Preferably, the parameters of SLM forming are: spot diameter: 80 μm; laser wavelength: 1.06~1.10 μm; laser power: 200~1,000 W; scanning speed: 500~1,000 mm/s; thickness of spread powder layer: 0.02~0.5 mm.

Preferably, in the combined apparatus for layer-by-layer interactive additive manufacturing with laser thermal/mechanical effects, the powder spreading module is moved along the guide rail so as to realize uniform powder spreading and reset.

Preferably, in the combined apparatus for layer-by-layer interactive additive manufacturing with laser thermal/mechanical effects, the liftable workbench of the hydraulic lifting module is lifted/lowered smoothly and steadily by means of the hydraulic lifting module, and is lowered as the height of the workpiece is increased.

Preferably, in the combined apparatus for layer-by-layer interactive additive manufacturing with laser thermal/mechanical effects, the movement trajectory of the SLM module is controlled by a mechanical atm during SLM forming.

Preferably, in the combined apparatus for layer-by-layer interactive additive manufacturing with laser thermal/mechanical effects, the movement trajectory of the LSP module is controlled by a mechanical arm during LSP.

Preferably, in the combined apparatus for layer-by-layer interactive additive manufacturing with laser thermal/mechanical effects, the waterproof layer application module maneuvers the waterproof layer by means of the motor and the pneumatic module, so that the waterproof layer moves, attaches, detaches and resets automatically during LSP of the external surface of the formed part.

Preferably, in the combined apparatus for layer-by-layer interactive additive manufacturing with laser thermal/mechanical effects, the waterproof layer application module is moved in the vertical direction by means of the pneumatic module so as to control the attachment/detachment of the waterproof layer to/from the external surface of the formed part.

Preferably, in the combined apparatus for layer-by-layer interactive additive manufacturing with laser thermal/mechanical effects, the waterproof layer application module is moved in the horizontal direction by means of the motor, so that the waterproof layer is moved and reset, without impact on the removal of the formed part and the following SLM forming.

Preferably, in the combined apparatus for layer-by-layer interactive additive manufacturing with laser thermal/mechanical effects, the waterproof layer is made of a self-adhesive waterproof aluminum foil; after the processing of a formed part is finished, the waterproof layer application module drives the drum to move intermittently by means of the motor, so that the waterproof layer can be replaced and water leakage resulted from reuse of the waterproof layer can be avoided.

Preferably, in the combined apparatus for layer-by-layer interactive additive manufacturing with laser thermal/mechanical effects, a uniform deionized water film in thickness of 1~2 mm is formed as a confinement layer by means of the water jetting module during LSP, to increase the peak pressure of the shock wave.

Preferably, in the combined apparatus for layer-by-layer interactive additive manufacturing with laser thermal/mechanical effects, the liftable workbench is disposed at the center and surrounded by the water channel in shape of a hollow square which is enriched with another hollow square, to prevent the formed part and the powder from being wetted or flooded by splashed water.

Preferably, in the combined apparatus for layer-by-layer interactive additive manufacturing with laser thermal/mechanical effects, the water in the water channel in shape of a hollow square which is enriched with another hollow square may be recycled via a water circulation module.

Beneficial effects of the present invention: the present invention provides a combined apparatus for layer-by-layer interactive additive manufacturing with laser thermal/mechanical effects, which utilizes a LSP module and a SLM module that operate in alternate, so as to perform LSP for formed parts in the forming process of the formed parts.

1. The apparatus utilizes SLM technology and LSP technology in combination to improve processing efficiency, and can be applied in industrial production more widely.
2. The apparatus provided in the present invention effectively overcome the challenges of "shape control" against deformation and cracking of the formed parts incurred by internal stress and "property control" against poor fatigue property incurred by metallurgical defects during SLM, and improves fatigue strength and mechanical properties of the formed parts.

In the figures: 1—LSP module; 2—water jetting module; 3—SLM forming module; 4—waterproof layer; 5—drum; 6—drum support; 7—threaded lead screw; 8—water channel in shape of a hollow square which is enriched with another hollow square; 9—pneumatic module; 10—base;

11—hydraulic lifting module; 12—liftable workbench; 13—formed part; 14—powder; 15—guide rail; 16—powder spreading module.

EMBODIMENTS

Figure 1:
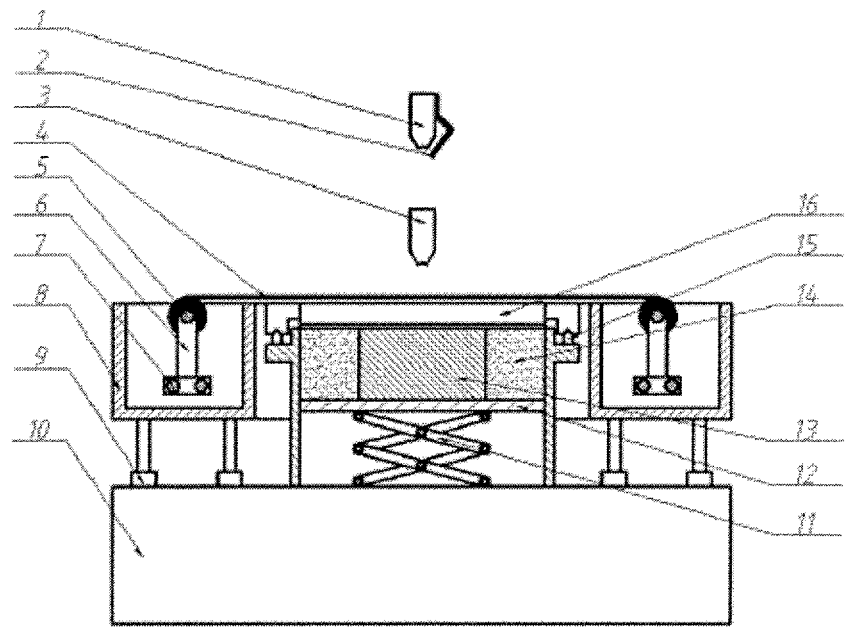
FIG. 1 is a front view of an example of the present invention.
Figure 2:
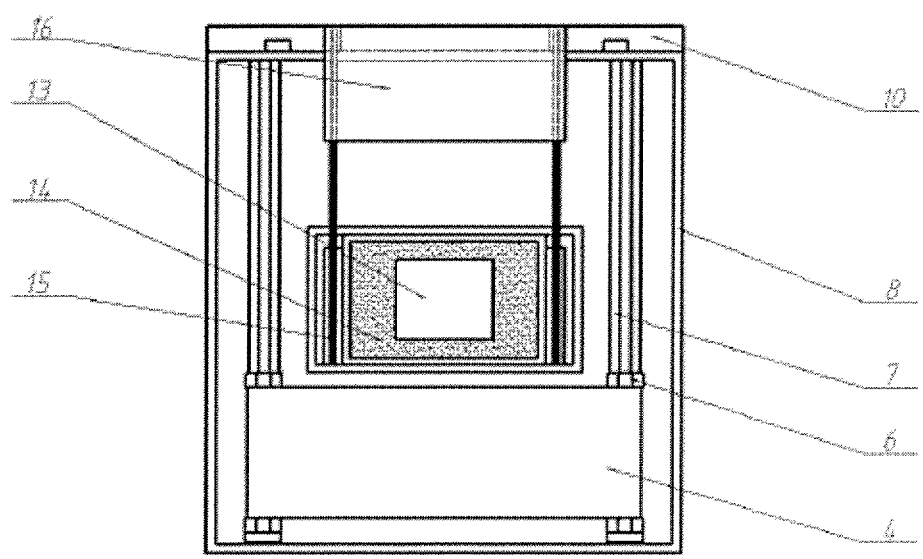
FIG. 2 is a top view of FIG. 1 (excluding the laser shock peening (LSP) module and the selective laser melting (SLM) forming module).

To overcome the drawbacks in the prior art, the present invention provides a combined apparatus for layer-by-layer interactive additive manufacturing with laser thermal/mechanical effects, which performs laser shock peening (LSP) in the forming process of formed parts mainly by utilizing LSP module and selective laser melting (SLM) module to operate in alternate and switch freely (as shown in FIGS. 1 and 2), and thereby effectively overcomes the challenges of "shape control" against deformation and cracking of the formed parts incurred by internal stress and "property control" against poor fatigue property of the formed parts incurred by metallurgical defects during SLM, improves fatigue strength and mechanical properties of the formed parts, and realizes high-efficiency and high-quality holistic processing of the formed parts.

See FIGS. 1 and 2. FIG. 1 is a front view of an example of the present invention; FIG. 2 is a top view of FIG. 1 (excluding the LSP module and the SLM forming module). The figures show a combined apparatus for layer-by-layer interactive additive manufacturing with laser thermal/mechanical effects.

Before SLM is executed, the powder spreading module 16 is moved along the guide rail 15 in a reciprocating manner to spread powder uniformly on the liftable workbench 12, and then the powder spreading module 16 automatically returns to its initial position (as shown in FIG. 2) after it accomplishes powder spreading, without any impact on the following operation of the SLM forming module and the LSP module.

Figure 3:
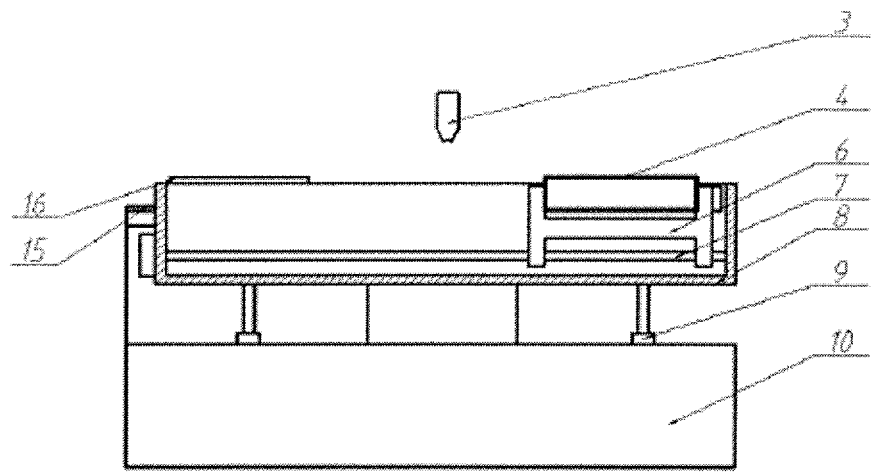
FIG. 3 is a left view of an example of the present invention during SLM forming.

The movement trajectory of the SLM module 3 is controlled by a mechanical arm during its operation (as shown in FIG. 3); at that point, the waterproof layer 4 is in a safe area, and does not impact the operation of the SLM forming module.

The parameters of SLM forming are: spot diameter: 80 µm; laser wavelength: 1.08 µm; laser power: 600 W; scanning speed: 800 mm/s; thickness of spread powder layer: 0.03 mm. SLM forming is performed; the operation of the SLM forming module 3 is finished after a layer of powder material is melted; then, LSP is performed by the LSP module 1.

The parameters of SLM forming are: spot diameter: 80 µm; laser wavelength: 1.08 µm; laser power: 600 W; scanning speed: 800 mm/s; thickness of spread powder layer: 0.02 mm. SLM forming is performed; the operation of the SLM forming module 3 is finished after a layer of powder material is melted; then, LSP is performed by the LSP module 1.

Figure 4:
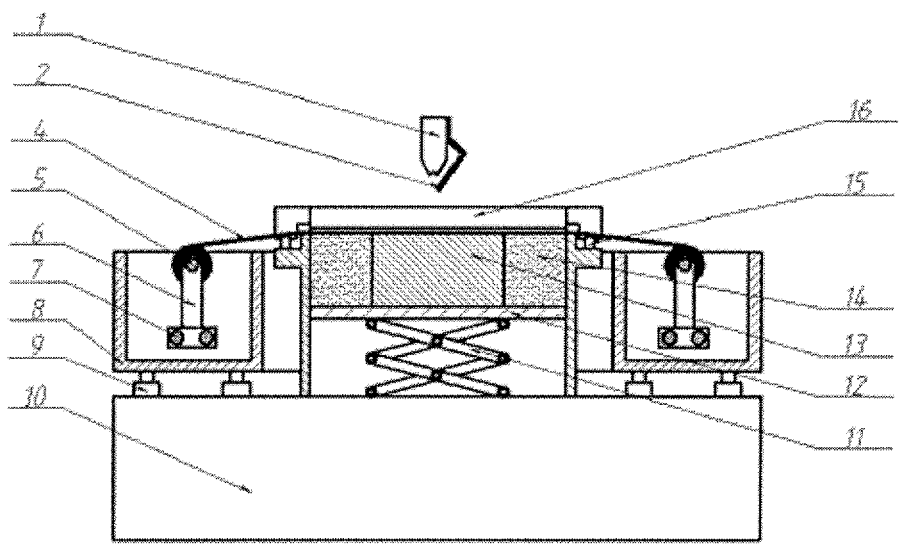
FIG. 4 is a front view of an example of the present invention during LSP.
Figure 5:
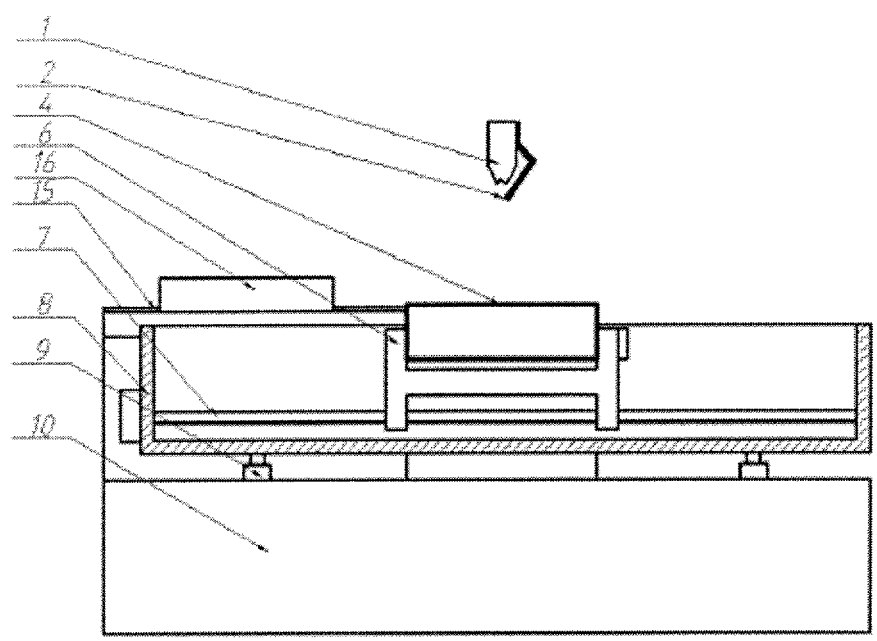
FIG. 5 is a left view of an example of the present invention during LSP.

Before the LSP module operates (as shown in FIGS. 4 and 5), the SLM forming module 3 is moved away by the mechanical arm from the space above the liftable workbench 12; likewise, the movement trajectory of the LSP module is controlled by the mechanical arm during the operation of the LSP module (as shown in FIGS. 4 and 5).

The parameters of LSP are: spot diameter: 3 mm; pulse width: 10 ns; pulse energy: 8 J, overlapping rate in both transverse direction and longitudinal direction: 50%. LSP is performed; after LSP, the operation of the LSP module is finished, the liftable workbench 12 is lowered by the hydraulic lifting module 11 by a certain height (usually less than 1 mm, because the depth of the layer affected by LSP is about 1 mm), and thereby a space is left for the following powder spreading operation.

After the powder spreading module 16 finishes the powder spreading, the SLM forming module 3 melts the next layer of powder.

In that way, the SLM module 3 and the LSP module 1 operate in alternate and can be switched freely, till the processing of a given formed part is accomplished. Finally, the waterproof layer 4 is moved by the threaded lead screw 7 driven by the motor to the space above the formed part 13, and is rotated by a certain angle via the drum 5, so that the waterproof layer used in the previous process deviates from the external surface of the formed part 13; next, a new waterproof layer is lowered by the pneumatic module 9 to a position 1 mm below the external surface of the formed part, and then is attached to the external surface of the formed part. The water jetting module 2 operates together with the LSP module to provide a confinement layer for LSP on the external surface of the formed part. The waterproof layer and the water channel in shape of a hollow square which is enriched with another hollow square are designed to prevent the formed part 13 and the powder from being wetted or flooded by splashed water (as shown in FIG. 2), and the water in the water channel may be recycled.

After the LSP, the LSP module 1 and the water jetting module 2 stop operation, the waterproof layer 4 is lifted by the pneumatic module 9 to the initial elevation and detached from the formed part, and is returned by the threaded lead screw 7 driven by the motor to its initial position; thus, the next formed part can be processed.

The invention claimed is:

1. A combined apparatus for layer-by-layer interactive additive manufacturing with laser thermal/mechanical effects, which comprises: a laser shock peening (LSP) module; a water jetting module; a selective laser melting (SLM) module; a waterproof layer application module comprising a waterproof layer, a drum, a drum support, a threaded lead screw and a motor; a water channel in shape of a hollow square that is enriched with another hollow square; a pneumatic module comprising an air compressor, an air cylinder and a control valve; a base; a hydraulic lifting module comprising a hydraulic cylinder, an electrical system and a liftable workbench; a guide rail; and a powder spreading module comprising a powder supply box, a scraper plate and a motor;

wherein, the LSP module and the SLM module are disposed right above the formed part, and is moved by a mechanical arm; the waterproof layer is disposed at the front side of the formed part, and is moved front and back by driving the threaded lead screw with the motor, and is moved up and down by the pneumatic module; a set of drum, drum support, threaded lead screw and motor is disposed at the left side and right side of the formed part respectively, wherein, the drum is disposed on the drum support, and the drum support is disposed on the threaded lead screw; the formed part may be placed on the liftable workbench; the powder spreading module is disposed at the back side of the formed part, and is moved front and back in a reciprocating manner along the guide rail; the water channel in shape of a hollow square which is enriched with another hollow square is disposed around the liftable workbench, and the pneumatic module is disposed below the water channel; the base is disposed at the lowest part of the entire apparatus.

2. The combined apparatus for layer-by-layer interactive additive manufacturing with laser thermal/mechanical effects according to claim 1, wherein, the LSP module and the SLM module may operate in alternate to attain an effect of strengthening the formed part during forming of the part.

3. The combined apparatus for layer-by-layer interactive additive manufacturing with laser thermal/mechanical effects according to claim 1, wherein, the parameters of LSP are: spot diameter: 3 mm; pulse width: 8-30 ns; pulse energy: 2-15 J; and overlapping rate in transverse direction and longitudinal direction: 50%; the parameters of SLM forming are: spot diameter: 80 µm; laser wavelength: 1.06-1.10 µm; laser power: 200-1,000 W; scanning speed: 500-1,000 mm/s; and thickness of spread powder layer: 0.01-0.1 mm.

4. The combined apparatus for layer-by-layer interactive additive manufacturing with laser thermal/mechanical effects according to claim 1, wherein, the powder spreading module is moved along the guide rail to realize uniform powder spreading and reset; and
the liftable workbench of the hydraulic lifting module is lifted/lowered smoothly and steadily by means of the hydraulic lifting module, and is lowered as the height of the workpiece is increased.

5. The combined apparatus for layer-by-layer interactive additive manufacturing with laser thermal/mechanical effects according to claim 1, wherein, the movement trajectory of the SLM module is controlled by a mechanical atm during SLM forming; and the movement trajectory of the LSP module is controlled by a mechanical arm during LSP.

6. The combined apparatus for layer-by-layer interactive additive manufacturing with laser thermal/mechanical effects according to claim 1, wherein, the waterproof layer application module maneuvers the waterproof layer by means of the motor and the pneumatic module, so that the waterproof layer moves, attaches, detaches and resets automatically during LSP of the external surface of the formed part; that is to say, the waterproof layer application module is moved in the vertical direction by means of the pneumatic module so as to control the attachment/detachment of the waterproof layer to/from the external surface of the formed part; the waterproof layer application module is moved in the horizontal direction by means of the motor, so that the waterproof layer is moved and reset, without impact on the removal of the formed part and the following SLM forming.

7. The combined apparatus for layer-by-layer interactive additive manufacturing with laser thermal/mechanical effects according to claim 1, wherein, the waterproof layer is made of a self-adhesive waterproof aluminum foil; after the processing of a formed part is finished, the waterproof layer application module drives the drum to move intermittently by means of the motor, so that the waterproof layer is replaced and water leakage resulted from reuse of the waterproof layer is avoided.

8. The combined apparatus for layer-by-layer interactive additive manufacturing with laser thermal/mechanical effects according to claim 1, wherein, a uniform deionized water film in thickness of 1-2 mm is formed as a confinement layer by means of the water jetting module during LSP, to increase the peak pressure of the shock wave.

9. The combined apparatus for layer-by-layer interactive additive manufacturing with laser thermal/mechanical effects according to claim 1, wherein, the liftable workbench is disposed at the center and surrounded by the water channel in shape of a hollow square that is enriched with another hollow square, to prevent the formed part and the powder from being wetted or flooded by splashed water; and the water in the water channel in shape of a hollow square that is enriched with another hollow square is recycled via a water circulation module.

10. A method for layer-by-layer interactive additive manufacturing with laser thermal/mechanical effects which is performed with the combined apparatus according to claim 1, wherein, specific steps of the method are as follows:
before SLM is executed, the powder spreading module is moved along the guide rail in a reciprocating manner to spread powder uniformly on the liftable workbench, and then the powder spreading module automatically returns to its initial position after it accomplishes powder spreading, without any impact on the following operation of the SLM module and the LSP module;
the movement trajectory of the SLM forming module is controlled by a mechanical arm during its operation; at that point, the waterproof layer is in a safe area, and does not impact the operation of the SLM forming module;
SLM forming is performed; the operation of the SLM forming module is finished after a layer of powder is melted; then, LSP is performed by the LSP module;
before the LSP module operates, the SLM forming module is moved away by the mechanical arm from the space above the liftable workbench; likewise, the movement trajectory of the LSP module is controlled by the mechanical arm during the operation of the LSP module;
after LSP, the operation of the LSP module is finished, the liftable workbench is lowered by the hydraulic lifting module by a certain height, and thereby a space is left for the following powder spreading operation;
after the powder spreading module finishes the powder spreading, the SLM forming module melts the next layer of powder;
in that way, the SLM module and the LSP module operate in alternate and eftwbeis switched freely, till the processing of a given foiined part is accomplished; finally, the waterproof layer is moved by the threaded lead screw driven by the motor to the space above the formed part, and is rotated via the drum, so that the waterproof layer used in the previous process deviates from the external surface of the formed part; next, a new waterproof layer is lowered by the pneumatic module to a position 1 mm below the external surface of the formed part, and then is attached to the external surface of the formed part; the water jetting module operates together with the LSP module to provide a confinement layer for LSP on the external surface of the formed part; the waterproof layer and the water channel in shape of a hollow square which is enriched with another hollow square are designed to prevent the formed part and the powder from being wetted or flooded by splashed water, and the water in the water channel may be recycled; and
after the LSP, the LSP module and the water jetting module stop operation, the waterproof layer is lifted by the pneumatic module to the initial elevation and detached from the formed part, and is returned by the threaded lead screw driven by the motor to its initial position; thus, the next formed part is processed.

* * * * *